Feb. 10, 1948.   W. F. FRENCH   2,435,775
DISC AND BLADE SHARPENER
Filed Nov. 20, 1943   2 Sheets-Sheet 1
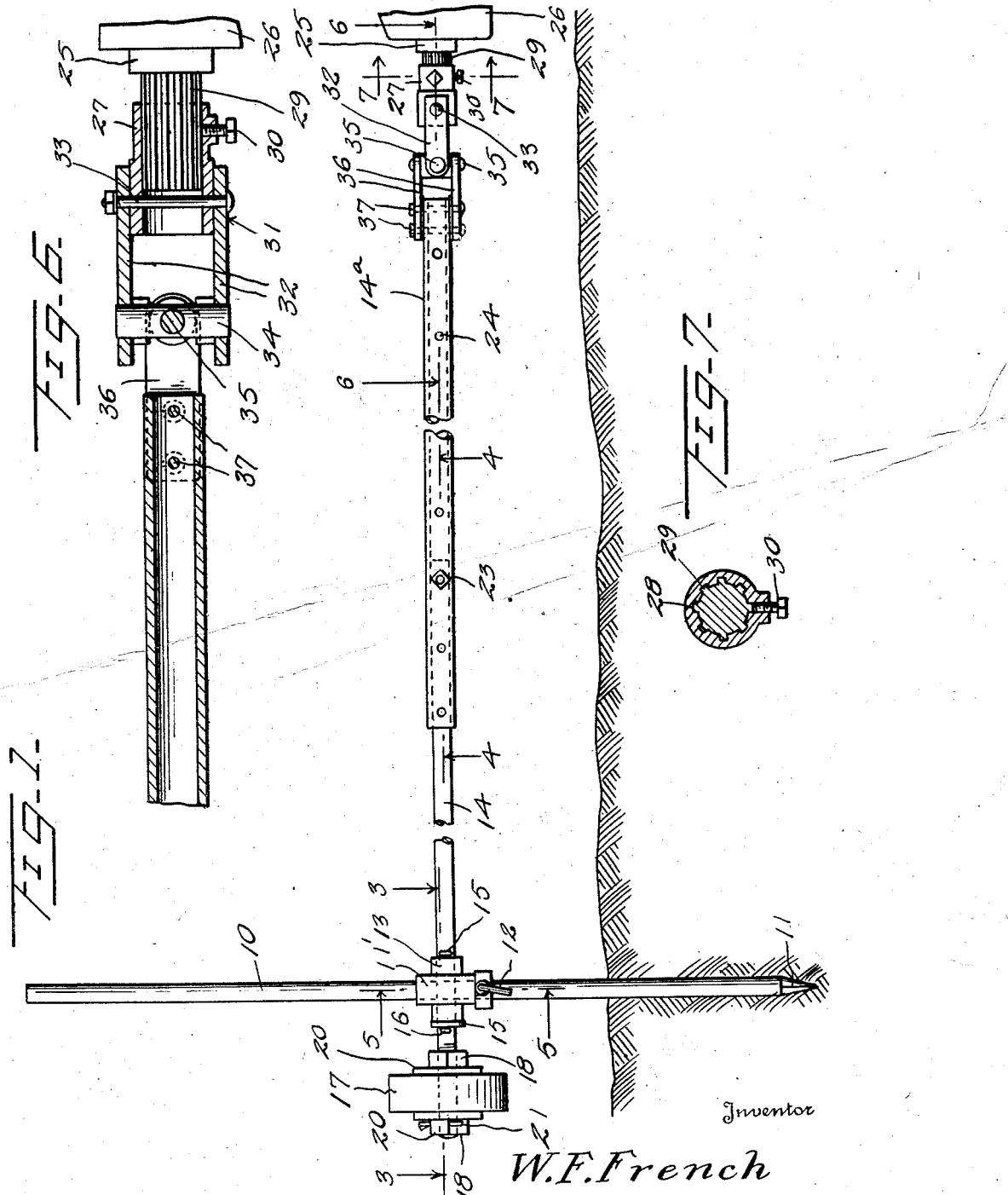
Inventor
W. F. French
By L. F. Randolph
Attorney

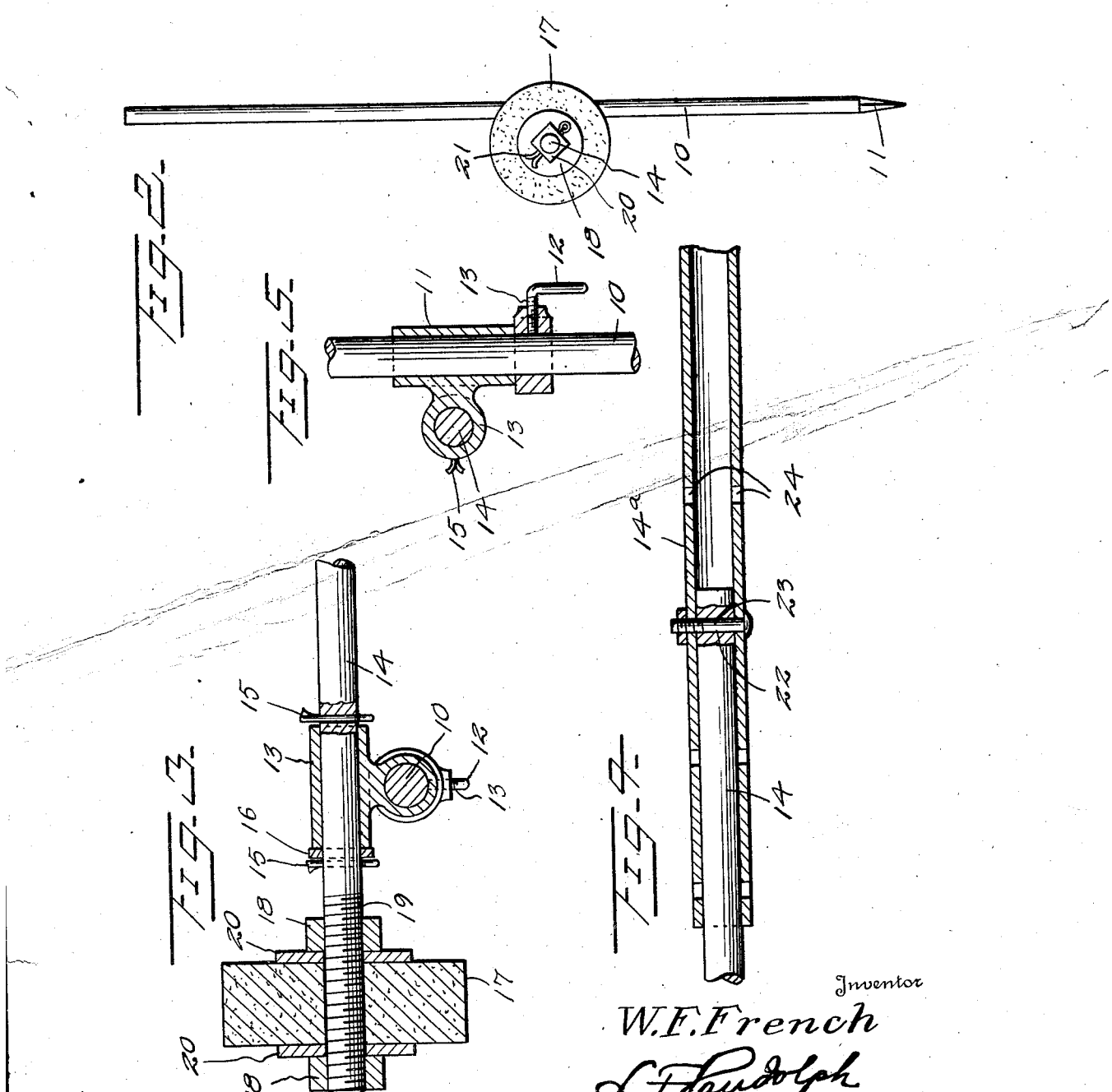

Patented Feb. 10, 1948

2,435,775

UNITED STATES PATENT OFFICE 2,435,775

DISC AND BLADE SHARPENER

Walter F. French, Schlater, Miss., assignor to
Horace Y. Kitchell, Greenwood, Miss.

Application November 20, 1943, Serial No. 511,121

2 Claims. (Cl. 51—170)

This invention relates to a sharpener for disc plow and disc harrow blades, mowing machine blades, and the like, and it aims to provide a novel construction capable of expeditious erection and power operation from the take-off mechanism of a tractor.

It is particularly aimed to provide a construction capable of ready assembly and disassembly, one capable of effective adjustments, and one which includes a universal joint connection and means for expeditious coupling to the power take-off means of the tractor.

The more specific objects and advantages will become apparent from a consideration of the description following taken in connection with accompanying drawings illustrating an operative embodiment.

In said drawings:

Figure 1 is a view in side elevation showing my improvement in operative position and connected to be driven from the power take-off device of a tractor;

Figure 2 is an end elevation;

Figure 3 is a longitudinal section taken on the line 3—3 of Figure 1;

Figure 4 is a longitudinal section taken on the line 4—4 of Figure 1;

Figure 5 is a vertical section taken on the line 5—5 of Figure 1;

Figure 6 is a longitudinal section on an enlarged scale taken on the line 6—6 of Figure 1; and Figure 7 is a detail section taken on the line 7—7 of Figure 1.

In carrying out the invention, I provide an upright post at 10 adapted to be driven securely into the ground at its pointed end 11, as suggested in Figure 1. Vertically slidable to any adjusted position on the post 10 is a suitable sleeve 11', adapted to be secured in any adjusted position through the turning of the handle 12 of a binding screw 13, screw-threaded in the sleeve 11', and bearing directly against the post.

Integral with the sleeve 11' is a suitable bearing 13 in which a shaft 14 is journaled for rotation, the same being held against longitudinal movement accidentally, by the passage of cotters or the equivalent 15, through openings therein adjacent opposite ends of the bearing 13. A washer 16 is preferably interposed between one of the cotters and the adjacent end of bearing 13.

Suitably fastened to one end of the shaft 14 is an appropriate grinding wheel 17. Said sharpener wheel 17 may be held in place by nut 18 screwed to threads 19 on the shaft 14 on opposite sides of such wheel. Washers 20 are preferably interposed between the wheel and nut 18. If desired, a cotter 21 may be passed through one or both of the nuts 18 and the shaft 14.

Said shaft 14 is extensible and adjustable since it includes a hollow or tubular section 14a telescoped partly over the other section. The latter has an opening 22 therethrough to accommodate the bolt 23 which is selectively applicable through openings 24 in the tubular section 14a, according to the adjustment or length desired.

Said shaft 14 is adapted to be driven from the power take-off shaft 25 of a conventional tractor 26 or any equivalent. Said shaft has a coupling sleeve at 27 which is interiorly grooved at 28 so as to fit the exteriorly splined portion 29 of the shaft 25. Coupling 27 will thus be rotated by the power take-off shaft 29 and the coupling is rendered more secure through the tightening of a binding screw 30, threaded to the coupling, and engageable directly against one of the splines.

The coupling 27 is connected with the shaft section 14a by a universal joint generally designated 31, such joint greatly facilitating the operation of the parts, especially where they are rapidly erected and slightly out of line. This universal joint connection consists of, for example, links 32 bolted at 33 to the coupling 27. Such links are connected together by bridge pieces 34 which in turn, are pivoted by a bolt 35, arranged at a right angle to the bolt 33, to links 36 fastened by bolts 37 to the adjacent end of the hollow shaft section 14a.

It will thus be seen that I have provided an appliance capable of rapid assembly and disassembly and well adapted for rotation from the power take-off shaft of a tractor, for the purpose of operating a sharpening wheel 17 or the like, which will effectively sharpen disc plow and disc harrow blades, mowing machine blades and various tools and parts.

Various changes may be resorted to provided they fall within the spirit and scope of the invention.

I claim as my invention:

1. An assembly of the class described comprising a post, a bearing on said post, a shaft journaled in the bearing and adapted to operate a grinding wheel or the like, a coupling generally of tubular form applicable endwise into engagement with the power take-off shaft of a tractor or the like, and means connecting the shaft to the coupling so that the shaft will be rotated from the power take-off shaft, said first-mentioned shaft being in sections relatively adjustable with respect to each other, means to adjust said bearing along said post, and an approximately universal connection between the first-mentioned shaft and the coupling.

2. An assembly of the class described comprising a post, a bearing adjustably mounted on the post, a shaft journaled in the bearing and adapted to operate a grinding wheel or the like, a coupling, universal means for connecting the coupling to the shaft whereby the shaft will rotate with the coupling, said coupling being adapted to be adjustably fixed to a driven rotary member for revolving the shaft, said shaft being formed of telescopic sections, and means for securing the shaft sections together in adjusted positions.

WALTER F. FRENCH.

REFERENCES CITED

The following references are of record in the file of this patent:

UNITED STATES PATENTS

| Number | Name | Date |
|---|---|---|
| 849,391 | Henry et al. | Apr. 9, 1907 |
| 1,487,962 | Manville | Mar. 25, 1924 |
| 2,100,808 | Kirkland | Nov. 30, 1937 |
| 2,244,586 | Venable | June 3, 1941 |

FOREIGN PATENTS

| Number | Country | Date |
|---|---|---|
| 510,292 | Germany | May 15, 1931 |